United States Patent Office 3,414,619
Patented Dec. 3, 1968

3,414,619
PURIFICATION OF AROMATIC DIAMINES
James M. Cross, New Martinsville, Clyde D. Campbell, Wheeling, and Sidney H. Metzger, New Martinsville, W. Va., assignors to Mobay Chemical Company, Pittsburgh, Pa., a corporation of Delaware
No Drawing. Continuation-in-part of application Ser. No. 438,390, Mar. 9, 1965. This application June 30, 1965, Ser. No. 468,599
6 Claims. (Cl. 260—582)

ABSTRACT OF THE DISCLOSURE

Reaction of o-aromatic diamines with carbon dioxide catalyzed with alkali metal or alkaline earth metal compounds to produce benzimidazolinones. Removal of o-aromatic diamines from diamine mixtures by selective reaction of the o-aromatic diamines with carbon dioxide catalyzed with alkali or alkaline earth metal compounds.

This invention relates to an improved process for the preparation of aromatic diamines and more particularly, to a process for the preparation of aromatic diamines free of o-diamines. This application is a continuation-in-part of copending application Ser. No. 438,390, filed Mar. 9, 1965.

Aromatic diamines have found wide-spread use as an intermediate in the production of organic isocyanates. Aromatic diamines are generally prepared by nitrating the nucleus whether it be benzene, toluene, naphthylene or the like and subsequently hydrogenating the nitro groups to form the corresponding amines. The reaction conditions for both the nitration and the hydrogenation are so chosen that a minimum amount of o-diamine is produced. The o-diamines are disadvantageous when present in the phosgenation step to convert the diamines to the corresponding isocyanates because the o-isomers are not converted to the isocyanates, but form tarry residues that react with the desired isomers resulting in a loss of the desirable reactants and in the ultimate yield of the isocyanate. In the nitration and hydrogenation steps, the formation of o-diamines has not been completely eliminated, and they still form in amounts up to about 4 percent.

In the commercial preparation of isocyanates, no suitable method has been derived for removing the diamines and thus, the residue remaining in the still after producing the aromatic isocyanates is present in large quantities which have not found any advantageous use. These black, tarry residues are difficult to discard and have in some instances, created small, black, mountainous ranges on real-estate owned by isocyanate producers.

It has been heretofore known in U.S. Patent 3,134,813 to react a crude mixture of toluylene diamine containing about 4% of the o-diamines with carbon bisulfide at a temperature of from about 25° C. to about 75° C. to convert the o-diamines to cyclic thioureas which remain in the residue upon distilling off the desired 2,4- and 2,6-toluylene diamines. While this method effectively removes the o-toluylene diamines, the use of carbon bisulfide is hazardous because it is a poisonous, toxic, highly reactive, flammable material.

The above-mentioned pending application describes a process for removing o-aromatic diamines from isomeric mixtures of aromatic diamines by reacting with carbon dioxide at elevated temperatures. This reaction occurs preferentially with the o-diamines to produce benzimidazolinones having melting points of about 300° C., which can be readily recovered as residue after the desired m-diamines have been removed by distillation.

It is an object of this invention to provide an improved method of removing o-aromatic diamines from a mixture of aromatic diamines. It is another object of this invention to provide a method for selectively removing o-aromatic diamines from a mixture of aromatic diamines. It is still another object of this invention to provide an improved method of removing o-toluylene diamines from a mixture of isomers of toluylene diamine. It is another object of this invention to provide a method of producing methyl benzimidazolinones.

The foregoing objects and others which will become apparent from the following description are accomplished in accordance with the invention generally speaking by reacting o-aromatic diamines with carbon dioxide at elevated temperatures in the presence of a catalytic amount of a basic alkali metal compound or alkaline earth metal compound. It has been found that using these catalysts in this reaction, the reaction temperature can be reduced and the period of time necessary for removal of the o-diamine from the mixture of diamines by the formation of benzimidazolinones is shortened.

Any suitable basic alkali metal or alkaline earth metal catalyst may be used such as, for example, sodium bicarbonate, potassium bicarbonate, calcium bicarbonate, lithium bicarbonate, sodium hydroxide, potassium hydroxide, lithium hydroxide, calcium hydroxide and magnesium hydroxide, potassium carbonate, sodium carbonate, calcium carbonate, calcium oxide, barium oxide, lithium hydride, calcium hydride, strontium hydroxide, sodium methylate, sodium phenolate and the like.

In the practice of the process in accordance with this invention, the o-diamines or mixtures of o-diamines together with the catalyst with other aromatic diamines are mixed with carbon dioxide at an elevated temperature and preferably at least 200° C. The upper temperature limit is determined only by the decomposition point of the reactants present. The process can be operated at atmospheric pressure, but it is preferred that superatmospheric pressures be used. If the process is operated at atmospheric pressure, it is preferred that the carbon dioxide is introduced into the aromatic diamine in the gaseous state and that the bubbles are maintained therein as long as possible by maintaining the mean free path of the bubbles very small. This can be accomplished by mechanical means such as rapid agitation, a plurality of baffles and other techniques, known for maintaining a gas within a liquid for long periods of time. As stated above, it is preferred that the process be conducted under pressure. A pressure of at least 400 p.s.i.g. is preferred.

The process in accordance with this invention is applicable wherever o-aromatic diamines are present in either small quantities or in quantities up to and including 100% o-aromatic diamines. For example, if it is desired to produce 5-methyl-benzimidazolinones, 3,4-toluylene diamine is reacted with carbon dioxide under the conditions specified. Such compounds are useful as intermediates in the preparation of polymers, products having physiological activity, dyestuffs and herbicides.

The invention is specifically applicable to the separation of o-aromatic diamines from a mixture of isomers wherein the diamine is to be ultimately used in the preparation of corresponding isocyanates by phosgenation. Any mixture of aromatic diamines can be treated in accordance with this invention to selectively remove the o-diamines such as, for example, phenylene diamines, toluylene diamines, chlorphenylene diamines, methoxyphenylene diamines, ethyl phenylene diamines, naphthylene diamines, diphenylene diamines, diphenylmethane diamines, diphenylpropane diamines and the like. Because of the commercial importance of toluylene diisocyanates, the invention is particularly applicable to the separation of o-toluylene diamines from an isomeric mixture containing primarily 2,4- and 2,6-toluylene diamines. As stated previously, the operating conditions used in the preparation of the isomeric mixture of toluylene diamines are maintained to keep the formation of the o-toluene diamines at a minimum. However, amounts in the range of from 3 to 4% generally are present after the hydrogenation of dinitrotoluene.

The invention is further illustrated but not limited by the following examples in which parts are by weight unless otherwise specified.

EXAMPLE 1

About 476.3 parts of an isomeric mixture of toluylene diamine having from about 3.8 to 3.9 percent of o-toluylene diamine and about 1.81 parts of sodium bicarbonate are charged into a stainless steel stirred autoclave. This autoclave is purged several times with carbon dioxide to remove all traces of air. The autoclave is then closed and pressurized from about 800 to 1000 p.s.i.g. with carbon dioxide and heated to a temperature of about 240° C. for about 5 hours. The pressure in the autoclave during this time is from about 1075 to about 1200 p.s.i.g. and no attempt is made to regulate the carbon dioxide pressure.

The material is removed from the autoclave and distilled under vacuum at a temperature of about 125–170° C. About 446.4 parts of toluylene diamine substantially free of o-diamines are recovered in the distillation. About 24.6 parts of solid are left as a residue and this solid material is identified by infrared spectra as being benzimidazolinones.

EXAMPLE 2

About 749 parts of an isomeric mixture of toluylene diamine having from 3.8 to 3.9 percent of o-toluylene diamine and about 7.49 parts (one percent) of sodium bicarbonate are charged into a stainless steel, stirred autoclave. This autoclave is purged several times with carbon dioxide in order to remove traces of air. The autoclave is then closed and pressurized to about 810 p.s.i.g. with carbon dioxide at 25° C. The autoclave is then heated to about 200° C. and held about 17 hours at this temperature with stirring. At the end of this time, the reaction mixture is substantially free of o-diamines as shown by vapor phase chromatograph.

The material is removed from the autoclave and distilled under vacuum at a temperature of about 125–170° C. Approximately 705 parts of toluylene diamine substantially free of o-diamines are recovered in the distillation. The residue consists mainly of benzimidazolinones.

EXAMPLE 3

(Comparison without catalyst)

About 749 parts of an isomeric mixture of toluylene diamine having from about 3.8 to 3.9 percent of o-toluylene diamine are charged into a stainless steel, stirred autoclave. This autoclave is purged several times with carbon dioxide in order to remove traces of air. The autoclave is then closed and pressurized to about 810 p.s.i.g. with carbon dioxide at about 25° C. The autoclave is then heated to about 200° C. and held at this temperature for about 17 hours with stirring. At the end of this time, the reaction mixture still contains approximately 1% o-diamines as shown by vapor phase chromatograph.

EXAMPLE 4

(Comparison without catalyst, atmospheric pressure)

About 1487 parts of a refined mixture of toluylene diamine isomers containing about 3.7% o-isomers is charged to a glass reaction flask. The reaction flask is equipped with a heating mantle, a turbine type mechanical stirrer, a thermometer, a gas "sparging" tube for carbon dioxide purging, and a two-stage condensing system, the first stage being a steam condenser while the second stage is a cold-water condenser. The flask contents are heated to about 245° C. with vigorous stirring and a constant stream of carbon dioxide is passed through the molten material. After about 6 hours treatment at this temperature, the diamine content is 3.3%. The temperature is then increased to about 276° C. and the carbon dioxide treatment is continued. The following results are observed:

| Hours heated at 276° C. | Total hours heated, including 245° C. treatment | Percent o-isomers |
| --- | --- | --- |
| 3 | 9 | 3.02 |
| 5 | 11 | 2.64 |
| 8 | 14 | 2.54 |
| 15 | 21 | 2.24 |
| 22 | 28 | 1.89 |
| 28 | 34 | 1.59 |

After this time, the reaction mixture contains an appreciable amount of o-diamines.

EXAMPLE 5

(5% NaHCO₃ catalyst, atmospheric pressure)

This experiment is conducted in the same manner and apparatus as that described in Example 4. About 934 parts of a refined mixture of toluylene diamine isomers, containing about 3.89% o-diamine, and about 47 parts of NaHCO₃ are charged to the reaction vessel. The mixture is heated to about 276° C. and the following results are observed:

Hours heated at 276° C.:         Percent o-diamines
3.5 ............................................. 2.54
6.5 ............................................. 1.52
9.5 ............................................. 0.39
11.5 ............................................ 0.14

From the above table, it is apparent that the reaction mixture is substantially free of o-diamines.

EXAMPLE 6

The procedure of Example 2 is repeated, however, 7.49 (one percent) of each of the following compounds are used in place of the sodium bicarbonate: potassium hydroxide, calcium bicarbonate, potassium carbonate, calcium hydroxide, magnesium hydroxide and sodium phenolate. In each case, after 17 hours, the percent of o-diamines remaining is less than that of Comparison Example 3.

It is of course to be understood that the examples presented herein are illustrative and that any of the alkali metal compounds and alkaline earth metal compounds set forth in the specification may be used in place of the specific compounds used and that any mixture of aromatic diamines containing o-diamines can be treated in accordance with the invention herein to remove the o-diamines.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A process for removing o-aromatic diamine from a mixture of aromatic diamines which comprises reacting said mixture of aromatic diamines with carbon dioxide at a temperature of at least about 200° C. in the presence of a catalytic amount of a basic compound selected from the group consisting of a basic alkali metal compound and a basic alkaline earth metal compound and separating the unreacted aromatic diamines.

2. The process of claim 1 wherein the aromatic diamines are selected from the group consisting of phenylene diamines, toluylene diamines, chlorophenylene diamines, methoxyphenylene diamines, ethylphenylene diamines, naphthylene diamines, diphenylene diamines, diphenylmethane diamines and diphenylpropane diamines and said basic compound is selected from the group consisting of sodium bicarbonate, potassium bicarbonate, calcium bicarbonate, lithium bicarbonate, sodium hydroxide, potassium hydroxide, lithium hydroxide, calcium hydroxide, magnesium hydroxide, potassium carbonate, sodium carbonate, calcium carbonate, calcium oxide, barium oxide, lithium hydride, calcium hydride, strontium hydroxide, sodium methylate and sodium phenolate.

3. The process of claim 2 wherein the basic alkali metal compound is sodium bicarbonate.

4. A process for removing o-toluylene diamine from an isomeric mixture of toluylene diamines which comprises reacting said mixture of toluylene diamines with carbon dioxide at a temperature of at least 200° C. in the presence of a catalytic amount of a basic compound selected from the group consisting of a basic alkali metal compound and a basic alkaline earth metal compound and separating the unreacted toluylene diamines.

5. The process of claim 4 wherein the basic compound is selected from the group consisting of sodium bicarbonate, potassium bicarbonate, calcium bicarbonate, lithium bicarbonate, sodium hydroxide, potassium hydroxide, lithium hydroxide, calcium hydroxide, magnesium hydroxide, potassium carbonate, sodium carbonate, calcium carbonate, calcium oxide, barium oxide, lithium hydride, calcium hydride, strontium hydroxide, sodium methylate and sodium phenolate.

6. The process of claim 5 wherein the basic alkali metal compound is sodium bicarbonate.

References Cited

UNITED STATES PATENTS

| | | | |
|---|---|---|---|
| 2,535,006 | 12/1950 | Woodward | 260—309.6 |
| 2,606,187 | 8/1952 | Hoffman | 260—309.2 |
| 2,642,396 | 6/1953 | Roddy | 260—309.2 |
| 3,128,310 | 4/1964 | Koch | 260—582 |
| 3,134,813 | 5/1964 | Pelley | 260—582 |
| 3,235,559 | 2/1966 | Blöcher et al. | 260—309.2 |
| 3,246,035 | 4/1966 | Forman | 260—578 |

FOREIGN PATENTS 811,692   4/1959   Great Britain.

HENRY R. JILES, *Primary Examiner.*

NATALIE TROUSOF, *Assistant Examiner.*